(12) United States Patent
Hendrickson et al.

(10) Patent No.: US 6,529,615 B2
(45) Date of Patent: Mar. 4, 2003

(54) METHOD OF DETERMINING AND TREATING THE HEALTH OF A CROP

(75) Inventors: Larry L. Hendrickson, Naperville, IL (US); Shufeng Han, Savory, IL (US); Monte A. Dickson, Naperville, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/728,102

(22) Filed: Dec. 1, 2000

(65) Prior Publication Data

US 2001/0036295 A1 Nov. 1, 2001

Related U.S. Application Data

(63) Continuation-in-part of application No. 09/129,564, filed on Aug. 5, 1998, now Pat. No. 6,178,253, which is a continuation-in-part of application No. 08/948,637, filed on Oct. 10, 1997, now Pat. No. 6,160,902.

(51) Int. Cl.$^7$ ................................................. G06K 9/00
(52) U.S. Cl. ........................ 382/110; 382/191; 47/48.5; 47/58.1; 702/5
(58) Field of Search ........................ 382/110, 162–164, 382/191; 348/144, 164; 47/117, 58.1, 48.5; 702/2, 3, 5

(56) References Cited

U.S. PATENT DOCUMENTS

| | | | |
|---|---|---|---|
| 2,446,874 A | 8/1948 | Geffner et al. ................. | 88/14 |
| 3,504,975 A | 4/1970 | White ........................... | 356/83 |
| 3,702,735 A | 11/1972 | Potter, Jr. .................... | 356/106 |
| 3,822,098 A | 7/1974 | Rudder et al. ............... | 356/209 |
| 3,829,218 A | 8/1974 | Alyanak ....................... | 356/74 |
| 3,927,400 A | 12/1975 | Knepler ....................... | 340/276 |
| 3,978,324 A | 8/1976 | Rayner ....................... | 235/151.3 |
| 3,984,671 A | 10/1976 | Fletcher et al. ............. | 235/181 |
| 4,134,683 A | 1/1979 | Goetz et al. ................. | 356/407 |
| 4,227,211 A | 10/1980 | Disbrow ...................... | 358/113 |
| RE31,023 E | 9/1982 | Hall, III ...................... | 47/1 R |

(List continued on next page.)

OTHER PUBLICATIONS

"Analysis of Aerial Photography for Nitrogen Stress Within Corn Fields"; Blackmer et al.; Agron J.; pp. 729–733 (1996).
PCT Form/ISA/220; International Search Report for Application PCT/US99/16426.

(List continued on next page.)

Primary Examiner—Jingge Wu

(57) ABSTRACT

A process for determining the health of crops in a field and for correcting deficiencies in the health of the crops is disclosed. The process includes georeferencing aerial photographs of at least a portion of the field, the aerial photographs having a particular spatial resolution; determining the green plane in the aerial photographs thus taken; preparing a relative greenness map of the field based upon the nitrogen reference area, the relative greenness map providing crop status information having spatial resolution equivalent to the spatial resolution of the aerial photographs; converting the relative greenness map to a nitrogen recommendation map having spatial resolution equivalent to the spatial resolution of the photographs; and applying nitrogen to the field according to the nitrogen recommendation map, whereby the nitrogen is applied to the field without loss of spatial information. A process for treating crops is also disclosed. The process includes establishing, in a field to be treated, at least one predetermined area of high nitrogen reference; photographing from the air, georeferenced portions of the field, using a particular spatial resolution; differentiating soil and crops, in the photographs thus obtained by segmenting images to select crop pixels; preparing a relative greenness map of the field from green plane based upon the high nitrogen reference area, the relative greenness map providing crop information having spatial resolution equivalent to the particular spatial resolution; and treating the crops in the field in accordance with the relative greenness map.

11 Claims, 9 Drawing Sheets

U.S. PATENT DOCUMENTS

| | | | |
|---|---|---|---|
| 4,560,275 A | 12/1985 | Goetz | 356/326 |
| 4,560,279 A | 12/1985 | Kouns | 356/369 |
| 4,599,001 A | 7/1986 | Richard | 356/419 |
| 4,644,582 A | 2/1987 | Morishita et al. | 382/6 |
| 4,963,742 A | 10/1990 | Abernathy | 250/338.5 |
| 4,974,209 A | 11/1990 | Hoult | 364/497 |
| 4,984,279 A | 1/1991 | Kidney et al. | 382/1 |
| 5,044,756 A | 9/1991 | Gaultney et al. | 356/446 |
| 5,048,103 A | 9/1991 | Leclerc et al. | 382/44 |
| 5,072,128 A | 12/1991 | Hayano et al. | 250/572 |
| 5,144,767 A | 9/1992 | McCloy et al. | 47/1.7 |
| 5,222,324 A | 6/1993 | O'Neall et al. | 47/1.7 |
| 5,246,164 A | 9/1993 | McCann et al. | 239/11 |
| 5,255,081 A | 10/1993 | Miyamoto et al. | 358/41 |
| 5,278,423 A | 1/1994 | Wangler et al. | 250/561 |
| 5,280,685 A | 1/1994 | Turner | 47/1.7 |
| 5,296,702 A | 3/1994 | Beck et al. | 250/226 |
| 5,315,564 A | 5/1994 | Upton | 367/140 |
| 5,348,002 A | 9/1994 | Caro | 128/633 |
| 5,353,052 A | 10/1994 | Suzuki et al. | 347/19 |
| 5,371,358 A | 12/1994 | Chang et al. | 250/226 |
| 5,381,624 A | 1/1995 | Davis et al. | 47/1.7 |
| 5,389,781 A | 2/1995 | Beck et al. | 250/226 |
| 5,412,219 A | 5/1995 | Chappelle et al. | 250/461.1 |
| 5,414,462 A | 5/1995 | Veatch | 348/135 |
| 5,467,271 A | 11/1995 | Abel et al. | 364/420 |
| 5,479,255 A | 12/1995 | Denny et al. | 356/319 |
| 5,488,479 A | 1/1996 | Williams et al. | 356/402 |
| 5,557,326 A | 9/1996 | Rantasuo et al. | 348/272 |
| 5,569,842 A | 10/1996 | Silvestri | 73/53.05 |
| 5,606,821 A | 3/1997 | Sadjadi et al. | 47/1.7 |
| 5,689,418 A | 11/1997 | Monson | 364/420 |
| 5,751,576 A | 5/1998 | Monson | 364/188 |
| 5,764,819 A | 6/1998 | Orr et al. | 382/110 |
| 5,845,229 A | 12/1998 | Rawlins | 702/2 |
| 5,999,650 A | * 12/1999 | Ligon | 382/110 |

OTHER PUBLICATIONS

Video Image Analysis as a Nondestructive Measure of Plan Vigor for Precision Agriculture; Commun. Soil Sci. Plant Anal..27 (3&4), 607–614 (1996).

Nitrogen Assessment in Wheat Using Computer Vision; Paper No. 962014; An ASAE Meeting Presentation Jul. 14–18, 1996.

Sensor For On The Go Control of Site Specific Nitrogen Top Dressing; Paper No. 961018; An ASAE Meeting Presentation; Jul. 14–18, Arizona.

Remote Sensing of Plant Nitrogen Status in Corn; Presented in Part as ASAE Paper No. 94–2117.

International Search Report for PCT Application No. PCT/US98/21334.

Filella et al. "Evaluating Wheat Nitrogen Status With Canopy Reflectance Indices and Discriminant Analysis", Crop Science, vol. 35, Sep.–Oct. 1995, pp. 1400–1405.

* cited by examiner

METHOD OF DETERMINING AND TREATING THE HEALTH OF A CROP

RELATIONSHIP TO OTHER APPLICATIONS

This application is a continuation-in-part of application Ser. No. 09/129,564, filed on Aug. 5, 1998 now U.S. Pat. No. 6,178,253 and entitled "A Method of Determining and Treating the Health of a Crop"; which is a continuation-in-part of application Ser. No. 08/948,637, filed on Oct. 10, 1997 now U.S. Pat. No. 6,160,902, and entitled "Method for Monitoring Nitrogen Status Using a Multi-spectral Imaging System."

FIELD OF THE INVENTION

The present invention relates to a method for determining the health of crops in a field, and more particularly relates to a method for determining the same by aerial photographic analysis allowing for real time or near real time correction of deficiencies in the health of the crop at any time during the growing season.

BACKGROUND OF THE INVENTION

It is well known that monitoring of agricultural crops is desirable to determine existing growing conditions so as to allow for improvement and maximization of yields. While there is considerable interest in remote sensing of crops in fields, most of the current attention is directed towards identification of atypical areas of fields that may indicate crop stress due to water, insect, disease or weed pressures. Although some attention has been directed toward identification of nutrient stress using remote sensing, the success of such identifications is generally ineffective unless nutrient stresses are sufficiently severe to reduce overall crop biomass. Moreover, as the current focus in remote sensing is directed towards anomaly detection, the most typical image product is a false color image, or a three-spectral (wavelength) image combining near infrared, red and green plane images with no better than approximately one meter spatial resolution per pixel. While interest is growing for better spatial resolution, the products necessary for such are not currently available because of the increase in cost and because file size increases exponentially with resolution, the cost being disproportionate to any increase in benefit obtained by an increase in information.

Other prior art regarding remote sensing for crop nitrogen characterization has demonstrated that the intensity of red, green and blue values of scanned color photographs is closely related to corn yields on plots that had varying nitrogen fertilizer rates. This relationship was determined during the late growing season, well after the normal times of nitrogen fertilization. While the results suggested that the different intensity values were due to nitrogen rates this was not clearly demonstrated. Moreover, the results did not demonstrate that the different intensity values were related to crop nitrogen levels.

Researchers have demonstrated that nitrogen stress can be observed using RGB aerial photos, but such observations have been qualitative in nature, and have not yet been used as a basis for immediate further nitrogen applications.

Still other prior art has demonstrated that hand-held chlorophyll meters such as the "SPAD" sold by Minolta Corporation gives measurements which are closely related to the nitrogen concentration in individual plants, and that these readings from a hand-held chlorophyll meter could be employed as a basis for supplementing required nutrients such as nitrogen. Chlorophyll, which is the related green pigments found in photosynthetic organisms, has been found to be closely related to the amount of nitrogen present in plants or crops. Thus, low chlorophyll concentration levels have been found to be indicative of slower growth in plants and ultimately lessening of yield in the crops in the field.

One of the real discoveries that would allow for remote sensing and analysis of the nitrogen contained in a plant in the field was the ability to segment between soil and crop pixels so as to permit discarding of the soil pixels and thus permit analysis only of the green vegetation or crops. The advantage of this may readily be seen because an analysis can start soon after the plants have started their growth and are emerging from the soil. In other words, a large mass of plant growth, which is usually exhibited only very late in the growing season, is unnecessary and analysis of the health of the crops may be obtained throughout the growing season. This permits correction almost immediately upon discovery of low nitrogen levels in the plants.

One way to analyze the health of the crop is to compare current images with prior images to determine whether the nitrogen or nutrient level is either the same, lower, or higher than in the previous image. A major problem with that kind of analysis is that the light present at different times of the day is difficult to monitor effectively. Shadows that are cast upon the field or the plants vary with light conditions, and in general lighting conditions in which the photographs were being taken all affect the green intensity. Therefore, comparison between previously taken photographic images and/or data in recently taken photographs is not conclusive as to whether or not the plants or crops are healthy, or need additional nitrogen. Moreover prior aerial photographic work was restricted to later in the growing season because of the inability of distinguishing between soil and crop pixels as well as mixed soil/crop pixels. Moreover, even when restricting the aerial photography to late in the growing season, shadows and the like, due to differences in lighting give inconclusive results as to the health of the biomass or canopy photographed. Additional discussions of prior art may be found in the parent application of which this is a continuation in part, the parent application being herein incorporated by reference.

Moreover, in many instances the time consumed in making a determination of the health of the crop, where stress in the crops due to lack of nitrogen poses a very real threat to yield. It is essential that corrective action be taken as quickly as possible, (i.e. within hours or days). Thus it is preferable in these instances to immediately process, in real time, the aerial photographs so that large amounts of data retention are unnecessary and all that is required is to convey the resultant information on the location of observed nitrogen deficiencies to the ground so that nitrogen may be applied to the areas requiring treatment in the field.

SUMMARY OF THE INVENTION

The present invention provides a process for determining not only the health of crops in the field but the ability to take corrective action as soon as realistically practicable. The process comprises the steps of establishing, in a field in which the health of the crops is to be determined, at least one predetermined reference area having a determined crop nutrient or nitrogen content. Aerial photographs of at least a portion of the field are obtained and georeferenced to known ground positions. A relative greenness map of the field based upon the nutrient or nitrogen referenced area is then derived, the relative greenness map indicating places in the field where the crops require immediate attention. The relative greenness map may include a gray scale value applied in the georeferenced file. The gray value map may be employed as the basis for the nitrogen prescriptions, higher gray values indicating lower crop nutrient or nitrogen concentrations which would require higher levels of additional nutrients to reach maximum yields. Concomitantly higher nutrient or nitrogen fertilizer rates would be applied as the gray values increase.

The georeferenced "relative" greenness map provides crop status information with spatial resolution equivalent to the spatial resolution of the original aerial images. This "relative" greenness map may then be converted directly to a nitrogen recommendation map through the use of a look up table based upon the relative greenness values and stage of crop development. For example, areas of the field with relative greenness values similar to those of the reference rows would receive little or no additional fertilizer, while areas showing significant nutrient stress would receive much higher rates. The actual rate recommended would also be based upon stage of crop growth, with higher nitrogen levels required for stress observed early in the season as compared to stress observed closer to, for example, harvest. In crops such as small grains, georeferenced maps of canopy extent can also be used to adjust nitrogen recommendations. Other factors such as soil type, available moisture, previous crop and manure applications would also be considered to further adjust the recommended rates.

The process outlined above for determining the health of crops in a field can be conducted at any time during the growing season by segmenting or differentiating the soil and green plants in the photographic images. Thus, in the early growing season, where soil is predominately exposed in the photographic image, differentiating or segmenting the soil pixels from the plant pixels will allow for a more accurate determination of a comparison between the "greenness" of the plants and the reference area having a determined nutrient or nitrogen content. Moreover, by having a predetermined reference area with a determined nitrogen content in each frame of photographs, the effects of shadowing, different times of day when the photographs are taken, etc. are diminished because, the greenness of the crop within the frame is compared to the reference strip in the frame.

The problems of resolution can be overcome by maintaining the overflight photographs at a predetermined level from the ground, the closer to the ground the better, with multiple frames being shot in sequence and later the photographs being mosaiced or pieced together to form a photographic image of the entire field. To this end, it may be helpful to provide reference points throughout the field or at least at close areas to the frame edges of the particular height that the photographs will be taken which will permit for easy piecing together of the frames thus taken to form a picture of the entire field. Moreover, and even more importantly, the reference points allow for greater accuracy of GPS position or registration of the aerial photograph to the ground GPS position.

It should be recognized that nitrogen stress (i.e. deficiency of nitrogen) in a crop causes symptoms that are almost identical to those caused by a lack of sulphur. Thus the finding of nutrient stress in the plant by the technique and process of the present invention, may be employed, along with knowledge of the field in which the crop is placed, to correct deficiencies other than just nitrogen. For example, an appearance of lack of greenness may be, after a study of the affected area, a determination that an insecticide or fungicide might be needed as well as nitrogen, or that a deficiency in greenness is caused by a lack of moisture, or insufficient sulphur. While principally the stress will be due to insufficient nitrogen, it should be recognized that other nutrient deficiencies may be found by the process of the present inventions. Moreover, upon recognition of other nutrient deficiencies, sulphur, iron or other nutrients may be applied to correct the deficiencies.

The present invention relates to a process for determining the health of crops in a field and for correcting deficiencies in the health of the crops. The process includes georeferencing aerial photographs of at least a portion of the field, the aerial photographs having a particular spatial resolution; determining the green plane in the aerial photographs thus taken; preparing a relative greenness map of the field based upon the nitrogen reference area, the relative greenness map providing crop status information having spatial resolution equivalent to the spatial resolution of the aerial photographs; converting the relative greenness map to a nitrogen recommendation map having spatial resolution equivalent to the spatial resolution of the photographs; and applying nitrogen to the field according to the nitrogen recommendation map, whereby the nitrogen is applied to the field without loss of spatial information.

The present invention further relates to a process for determining the health of crops in a field and for correcting deficiencies in the health of the crops. The process includes georeferencing aerial photographs of at least a portion of the field, the aerial photographs having a particular spatial resolution; determining the green plane in the aerial photographs thus taken; and preparing a relative greenness map of the field based upon the nutrient reference area, the relative greenness map providing crop status information having spatial resolution equivalent to the particular spatial resolution; converting the relative greenness map to a nutrient recommendation map having spatial resolution equivalent to the particular spatial resolution; and applying nutrient to the field according to the nutrient recommendation map, whereby the nutrient is applied to the field without loss of spatial information.

The present invention further relates to a process for treating crops. The process includes establishing, in a field to be treated, at least one predetermined area of high nitrogen reference; photographing from the air, georeferenced portions of the field, using a particular spatial resolution; differentiating soil and crops, in the photographs thus obtained by segmenting images to select crop pixels; preparing a relative greenness map of the field from green plane based upon the high nitrogen reference area, the relative greenness map providing crop information having spatial resolution equivalent to the particular spatial resolution; and treating the crops in the field in accordance with the relative greenness map.

The present invention further relates to a process for determining the health of crops in a field and for correcting deficiencies in the health of the crops. The process georeferencing aerial photographs of at least a portion of the field, the aerial photographs having a particular spatial resolution; preparing a relative greenness map of the field based upon the nutrient reference area, the relative greenness map including relative greenness values and having spatial resolution equivalent to the particular spatial resolution; converting the relative greenness map directly to a nutrient recommendation map based upon the relative greenness values; and applying nutrient to the field according to the nutrient recommendation map.

The present invention further relates to various features and combinations of features shown and described in the disclosed embodiments.

These and other objects, features and advantages are accomplished according to the instant invention by providing a process for determining the health of crops in a field and for correcting deficiencies in the health of the crops is disclosed. The process includes georeferencing aerial photographs of at least a portion of the field, the aerial photographs having a particular spatial resolution; determining the green plane in the aerial photographs thus taken; preparing a relative greenness map of the field based upon the nitrogen reference area, the relative greenness map providing crop status information having spatial resolution equivalent to the spatial resolution of the aerial photographs; converting the relative greenness map to a nitrogen recommendation map having spatial resolution equivalent to the spatial resolution of the photographs; and applying nitrogen to the field according to the nitrogen recommendation map, whereby the nitrogen is applied to the field without loss of spatial information. A process for treating crops is also disclosed. The process includes establishing, in a field to be treated, at least one predetermined area of high nitrogen reference; photographing from the air, georeferenced portions of the field, using a particular spatial resolution; differentiating soil and crops, in the photographs thus obtained by segmenting images to select crop pixels; preparing a relative greenness map of the field from green plane based upon the high nitrogen reference area, the relative greenness map providing crop information having spatial resolution equivalent to the particular spatial resolution; and treating the crops in the field in accordance with the relative greenness map.

Other advantages of the invention and a more complete understanding of it may be obtained with reference to the following specification and claims taken in conjunction with the accompanying drawings in which:

DESCRIPTION

Figure 1:
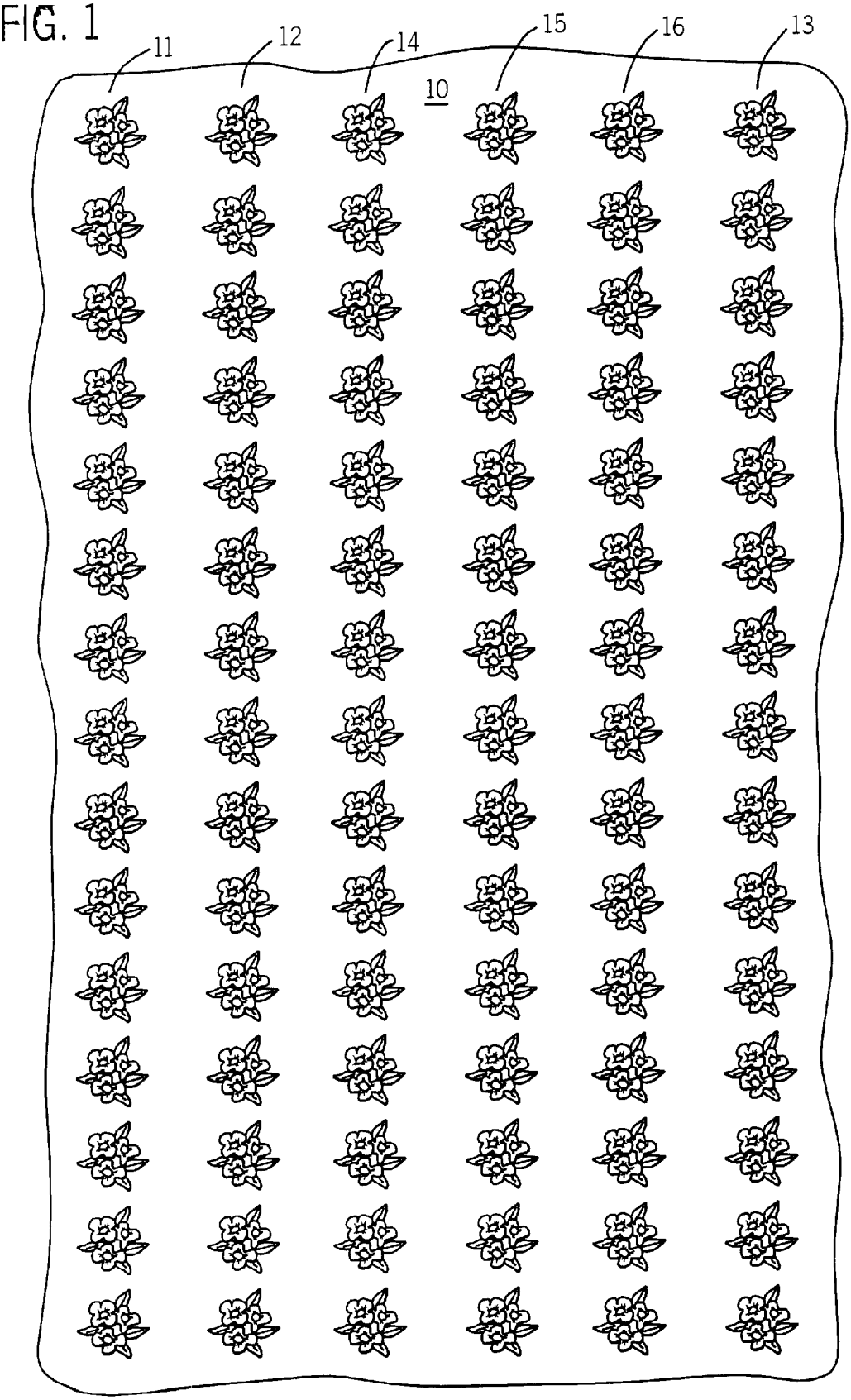
FIG. 1 is a view in plan of a portion of a field to which the process of the present invention is to be applied.
Figure 2:
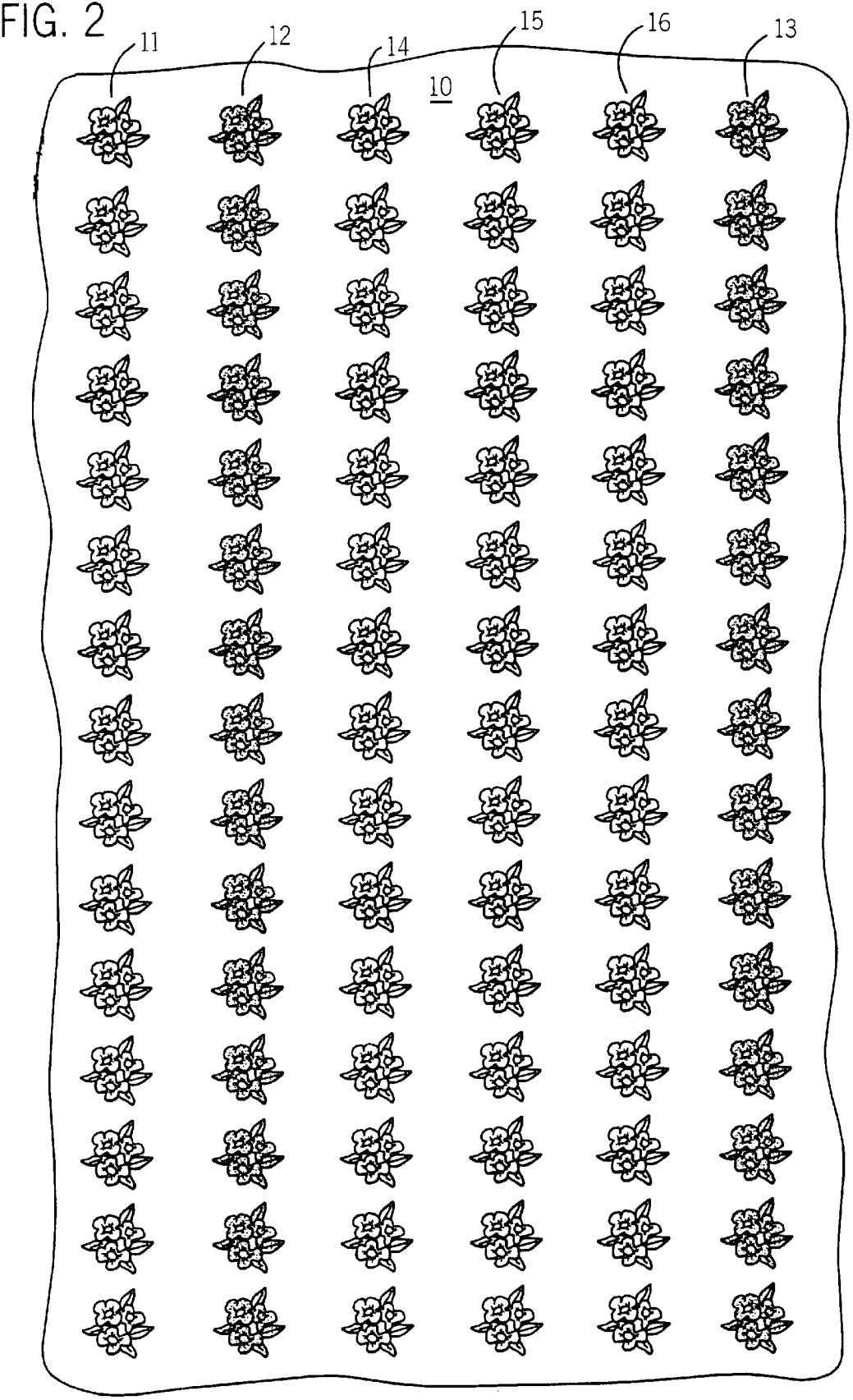
FIG. 2 is a view similar to FIG. 1 but in which a predetermined area, in the illustrated instance two rows, has been treated with an excess of nitrogen fertilizer to provide reference rows, strips or areas to facilitate the determination of the health of the crops in the field and in accordance with the process of the present invention.

Referring now to the drawings, and especially FIG. 1 thereof, a portion of a field 10 having a plurality of plant containing rows 11, 12, 13, 14, 15 and 16 are illustrated therein. Between the individual rows, and surrounding the individual plants in a row is soil or earth. In accordance with the invention, and referring now to FIG. 2, in each of the fields for which the health of the crops is to be determined, at least one predetermined reference area of the crops having a determined nutrient, in the present instance nitrogen, content is provided. In the illustrated instance, rows 12 and 13 have been provided with extra nitrogen fertilizer, slightly more than the general amount that would normally be applied to the remainder of the field during planting. For example, if 100 pounds of nitrogen is to be applied per acre to a particular field, rows 12 and 13 are provided with fertilizer at a rate of 110 to 120 pounds per acre. It should be understood that these high nitrogen reference strips may be typically wider than a single row. The single rows designated are for illustration only.

It should be understood that the high nitrogen reference strips, such as rows 12 and 13, may be subdivided to provide reference areas with appropriate gray level values. The reason for utilizing an excess of nitrogen to establish the reference strips is to insure that nitrogen is not limiting the growth or reflectance of plants growing in the strips. It should be recognized that both growth and reflectance are also impacted by other field characteristics, such as the level of other nutrients, e.g. moisture, sulphur or even other environmental or soil condition factors. Thus if an average gray level for the entire strip or row was utilized, an inappropriate reference value for a particular portion of the field may be employed. This could cause over or under application of nitrogen to some adjacent regions of the field.

To circumvent this problem, it may be desirable to subdivide each reference strip to provide a more region specific reference value for all areas of the field. The number of subdivisions will, of course, depend upon the variability of the field. Historical references to particular fields may be employed to determine the variability of particular fields. If a field is relatively uniform, a single value for each reference strip is appropriate. Alternatively, more subdivisions may be necessary in regions of the field that are more variable (based upon the variability of gray scale values within the reference rows.)

One approach employed for subdivision is to repetitively halve each reference strip until each new subdivision meets an established level of variability. For example, the halving process may be continued until the coefficient of variation is less than a selected value, e.g. 10%. Of course other procedures for establishing appropriate gray level values to use as reference value may be employed to provide more region specific reference values for all areas of the field.

Figure 5:
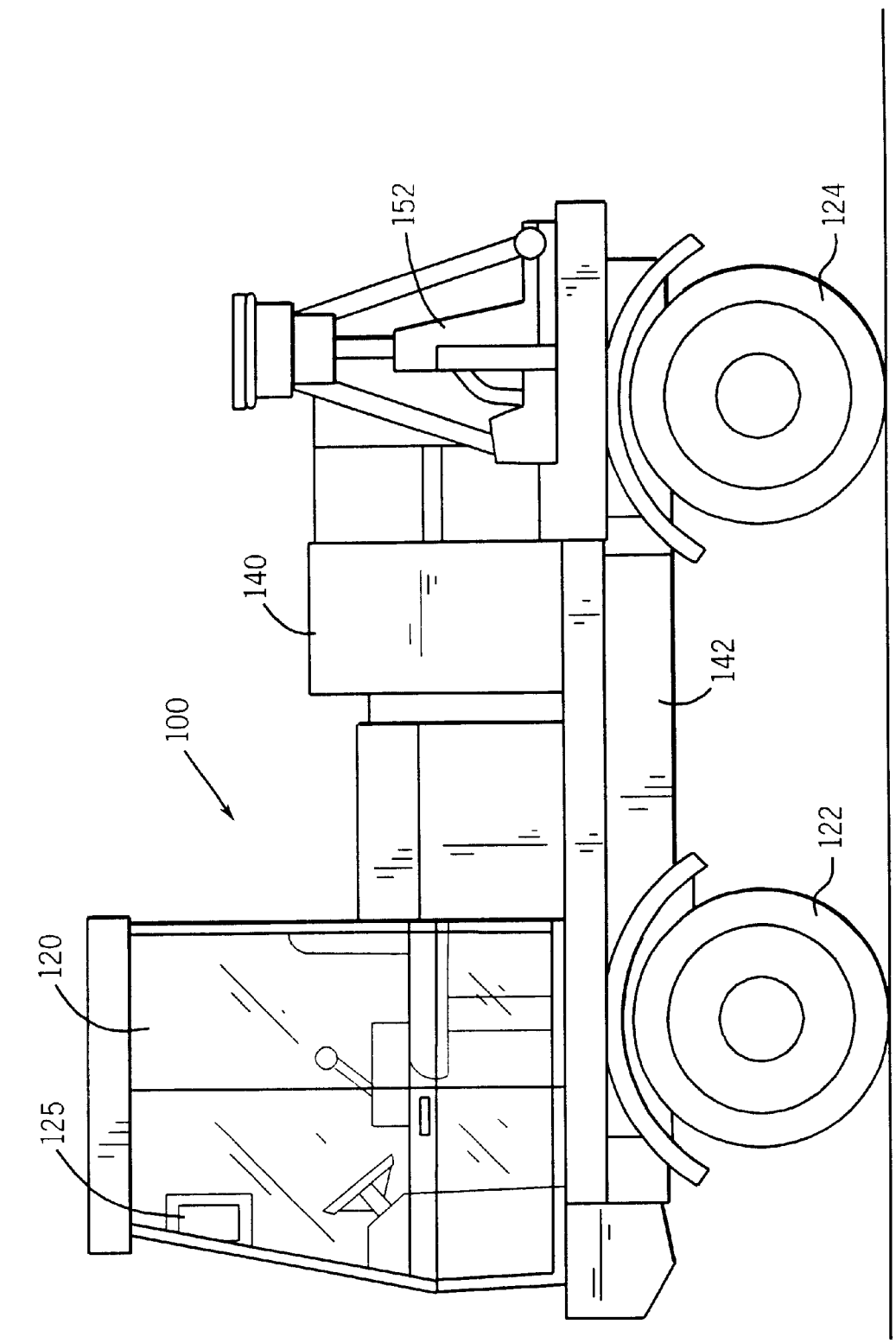
FIG. 5 is a view of a self-propelled sprayer or applicator having mounted thereon fertilizer tanks or bins for application of nutrients, e.g. nitrogen at predetermined selected locations in accordance with the invention and where determined that there is a nutrient deficiency.

The application of the fertilizer may be conventionally done and is schematically illustrated in FIG. 5 as by a farm vehicle, in the illustrated instance, a self propelled sprayer 100 containing fertilizer bin 140 mounted thereon. The self propelled sprayer 100 includes an operator controlled cab 120 thereon. The sprayer 100 contains conventional engine and drive train which are coupled to driven front and rear wheels 122 and 124 respectively. As shown, the sprayer 100 includes a frame 142 upon which is mounted thereon the bins 140 for applying nitrogen rich fertilizer as through a delivery system 152 to selected plants in predetermined rows in the field 10. The sprayer 100 may also include herbicide/insecticide containers and applicators (not shown). Alternatively, the bin 140 may contain other nutrient feed bins either for liquid or granular dispensing. Note: early in the growing season or with crops that do not grow to great heights, a tractor with towed implement containing fertilizer applicators may be employed.

The cab 120 of the farm vehicle includes a cab display unit 125 which may be connected to a data processing unit such as a computer and the like, as well as to a global positioning system (GPS) signal receiver and an associated differential DGPS signal receiver. The GPS and DGPS receiver may be manufactured for example by Trimble Navigation Ltd. of California, while the (differential signal) may be provided by Omnistar, Inc. of Arizona. The receiver determines the longitude and latitude coordinates of the farm vehicle from signals transmitted by the GPS satellite network. The accuracy of the location data is improved by applying correction signals received by the DGPS portion of the receiver. The differential correction signals are employed to correct errors present on the GPS signals including the selective availability error signal added to the GPS signals by the U.S. Government. As will become more evident hereinafter, a fertilizer correction signal for georeferenced portions of the field may be applied or transmitted to the farm vehicle, or to a base station, as from an aircraft or the like that has analyzed the health of the field, as by the method of the present invention.

Figure 3:
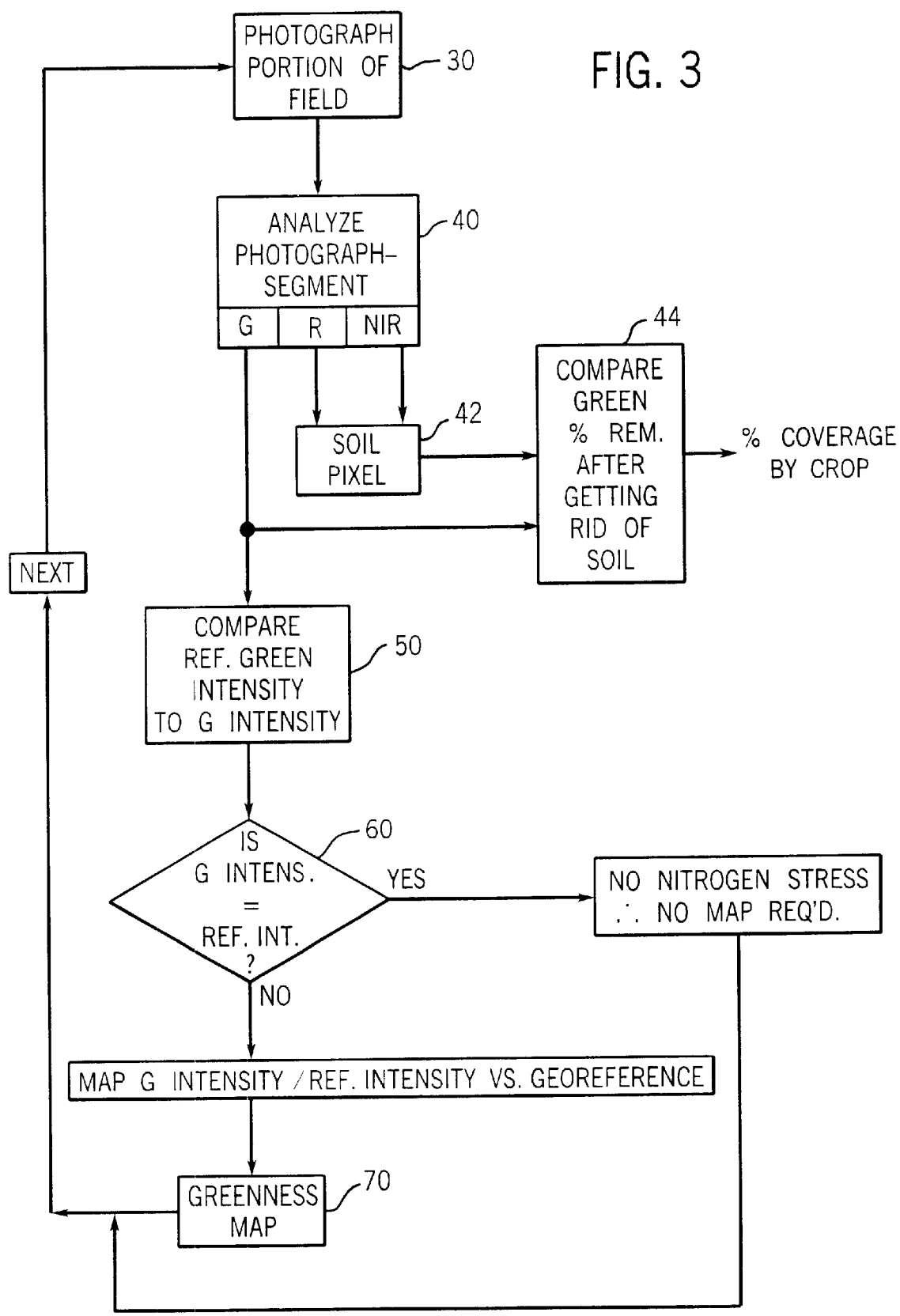
FIG. 3 is a flowchart illustration of the process in accordance with an exemplary embodiment of the present invention.
Figure 4A:
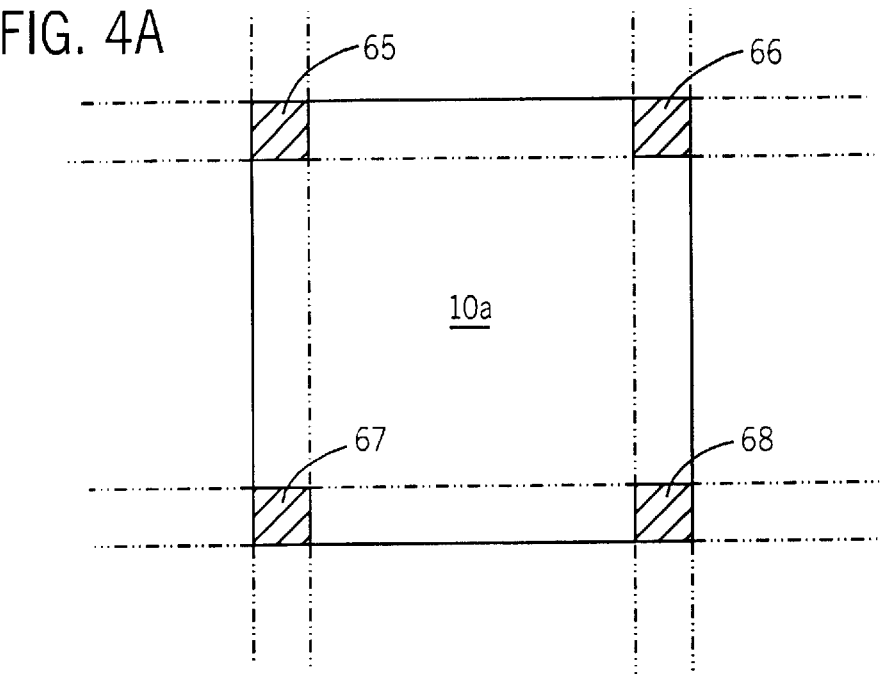
FIG. 4A is an enlarged view in plan of a portion of the field illustrated in FIG. 4B, illustrating an added feature of the present invention, in which each portion of the field to be photographed, may contain reference points to facilitate greater accuracy of GPS registration between the aerial photograph and the field.
Figure 4B:
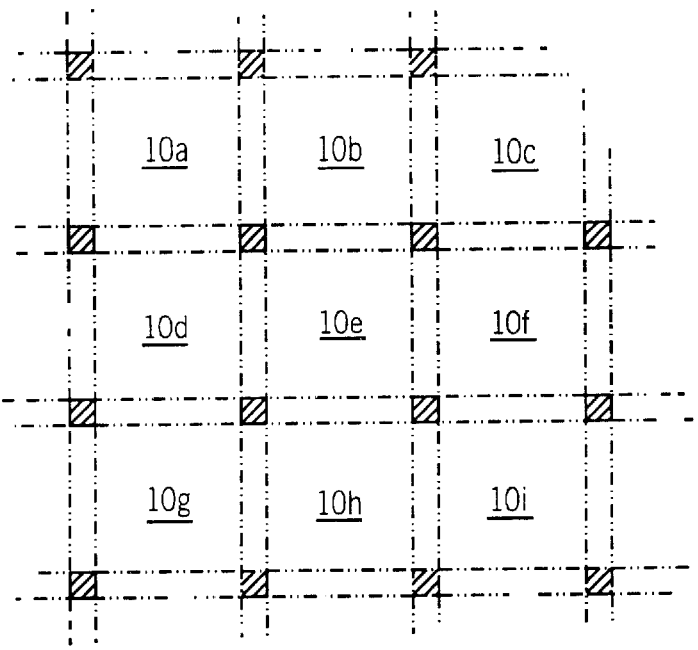
FIG. 4B is a fragmentary schematic view in plan of such a composite field photograph.
Figure 4C:
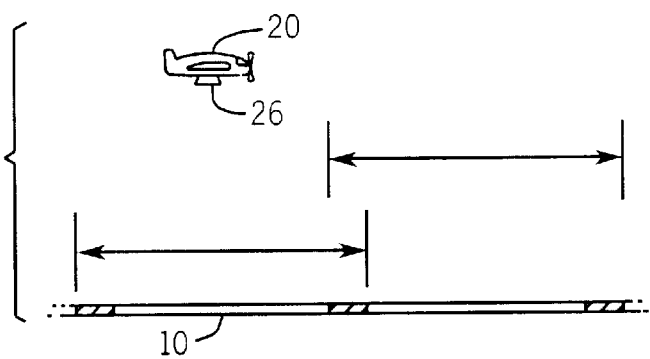
FIG. 4C is a side elevational view of a plane with a camera attached and photographing sequentially predetermined areas corresponding to the areas schematically illustrated in FIGS. 4A and 4B.

Turning now to FIGS. 3 and 4C, the first step in the process of the present invention (subsequent to establishing at least one predetermined reference area of crops having a determined nutrient (e.g. nitrogen) content) is to obtain photographic images of at least portions of the field while georeferencing the areas on the photographs. To this end, an airplane or aircraft 20 is illustrated in FIG. 4C with a camera 26 depending therefrom to take photographs of at least portions of the field 10. The resolution of a camera designed to take such photographs may include the design set forth in the parent application. Alternatively, a digital color camera such as a Kodak DCS 460 may be employed. Assuming an aircraft height over the earth of approximately 1,000 feet, a single frame may result in a picture of approximately 25 acres. Since the Kodak camera has approximately 3,000 by 2,000 pixels (6,000,000 pixels) in one frame, assuming a 25 acre per frame photographic image or data, and inasmuch as one acre equals 43,560 square feet, each pixel covers 0.1815 square feet or an area of 5.112 inches by 5.112 inches. While the Kodak camera has a single CCD with a striped filter masked on the CCD, the color camera described in the parent application includes 3 CCD arrays which individually detect the same scene in three different wave length ranges: green, red, and near infrared. As discussed in the parent application, the optional wavelengths for crop characterization are green in the wavelength range of 550 nm (+/−20 nm), red in the wavelength range of 650 nm (+/−40 nm) and near infrared in the wavelength range of 800 nm (+/−40 nm).

Of course, different bandwidths may be used. Additionally, the specific optimized wavelengths may depend on the type of vegetation being sensed. Thus in the above example, the area of each pixel in the field of view is approximately 26.136 square inches when the field of view is 25 acres. When the aircraft is closer to the ground, the frame will cover fewer acres and therefore the area of each pixel in the field of view will be considerably less.

After a photograph of a portion of the field is taken by the camera 26 mounted in the plane 20, and as depicted in box 30 of FIG. 3, the photograph is analyzed as at 40 in FIG. 3. The CCD arrays in the camera, and as is conventional in cameras of this type, convert, by an A/D converter, the signals for green, red and near infrared into digital signals and the data from these signals may be employed for analysis of crop characteristics of the imaged vegetation, (i.e. the vegetation or plants or crops in the field 10).

In this connection the green intensity in reference rows 12 and 13 may be compared to the green intensity for the remaining portion of the frame, such as indicated at box 50 and if the entire frame's green intensity is equal to the reference intensity, clearly no further nitrogen must be applied to the field. Whatever the comparison may be, as illustrated in block 60, the green intensity is referenced to the reference intensity and this relative greenness value can be related to its position in the field to form a map which can be referred to as a "relative greenness" map, hereinafter referred to as a "greenness" map 70. By handling the greenness intensity with reference to the reference intensity in this manner, a simple ratio can be placed on the greenness map illustrating the percentage of greenness of any particular portion of the frame relative to the referenced intensity which will indicate whether further nitrogen is required. Inasmuch as the plot is georeferenced, the location on the field of that particular frame is assured. The aircraft then may proceed in sequence to the next adjacent plot or portion of the field (with some overlap) and take another photograph. In passing it is noted that this is much like a step-and-repeat operation.

In the event that the photographs have been taken early in the growing season, where plant size is relatively small as compared to the exposed soil in the field, by employing only the green plane and comparing its contents to the reference green intensity, and ignoring or segmenting the soil pixels, the health of the field at any portion of the growing season may be determined. Moreover, because of the ability to georeference the information taken from the camera, locations where additional nitrogen is required to enhance the yield of the field is readily viewable and available to the operator. As set forth heretofore, there are three principal and useful wavelengths, and images are formed in the camera for light reflected at each of the wavelengths. A red image, a near infrared image and a green image are formed from the CCD arrays with the camera.

Crop pixels tend to absorb red and reflect infrared wavelengths. This determines whether a particular pixel is crop or soil. If soil, this pixel may be discarded, and the health of the crop is determined by light reflectance in the green plane for the remaining pixels.

Additionally, by segregating the soil pixels and comparing the percentage of the image pixels remaining after separating the soil pixels, (see blocks 42 and 44 in FIG. 3), the percentage of coverage of the portion of the field by vegetation may be determined. This is commonly referred to as canopy coverage.

As the plane takes photographs that are step and repeat along the field in, for example, approximate 25 acre frames, it is essential that the GPS positions within this image are accurately locatable so that application of nitrogen based upon GPS position is applied to the correct areas.

In this connection, it is desirable that the frames may be pieced together to form a composite of the field. The composite is much like piecing together a crossword puzzle or a mosaic and the manner in which accurate GPS position is assured may also be employed to establish reference points in the field which appear in each frame when the photograph is being taken.

Moreover, and more importantly the reference points allow for greater accuracy of GPS position or registration of the aerial photograph to the ground GPS position. To this end, and referring now to FIGS. 4A and 4B, referenced areas may be placed at the corners of each map frame, such as shown at 65, 66, 67 and 68 of each 25 acre frame or plat 10*a*. The reference points in the field may be located in any convenient manner, and may even incorporate high nitrogen areas or be incorporated as part of the rows in which high nitrogen has been incorporated. Moreover, inasmuch as shadows, lighting and so forth play such an important part in determining the intensity of the reference with regard to the intensity of the greenness of the leaves of the crop, it is preferable that at least one such high intensity reference (i.e. reference nitrogen level) be incorporated in each frame. Thus the references 65–68 may serve the important function of insuring greater accuracy of GPS registration of air/ground GPS position, but also facilitates the placing of, for example, frame 10*a* in position with regard to frames 10*b*, 10*c*, 10*d* through 10*i*. It should be recognized that the reference areas may be bare or plantless areas, different color dyed areas, and may be located in any convenient pattern. For example, the frame reference point may be a bare area in the middle of each frame.

Thus the greenness map 70 may be composed by computers on the aircraft in real time, thus saving in storage requirements. Of course the map may be transmitted to the farm vehicle 100 in the field and nitrogen deficiency correction may start almost immediately, if desired. Inasmuch as nitrogen deficiencies are georeferenced, and the sprayer operator, through his on board global positioning system knows exactly where he is, immediate or later application of nitrogen is relatively easy.

Figure 6:
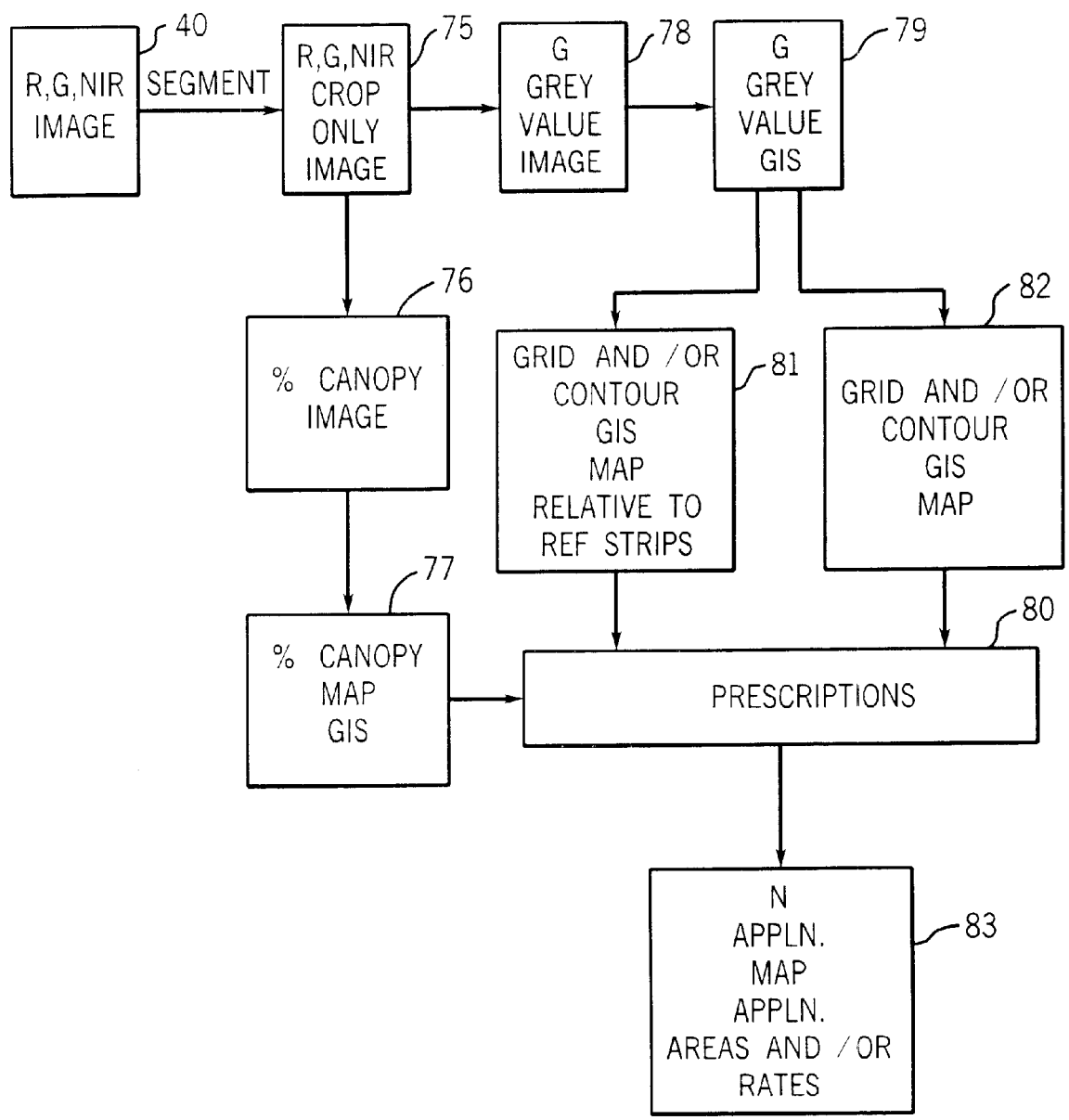
FIG. 6 is another flowchart in which the images from the digital camera may be segmented to not only display the percentage of canopy of the crop, but also to allow the conversion of the green images to a gray value image to facilitate easy identification of nutrient deficiencies, and their locations. This FIG. also describes the method for relating greenness maps and canopy maps to provide nitrogen application maps.

Referring now to FIG. 6, the segmented images such as shown at 40 in FIG. 3 may be separated so as to give a green only image at 75 from which the percentage canopy image may be calculated or derived as at block 76 to generate a Geographic Information System (GIS) type map. Moreover, the green plane image, such as shown in blocks 78, may be utilized by a GIS Program to provide a gray scale value for exact positions within the field as at 79. The gray scale image may then be converted to a grid and or contour GIS map which may be applied as at 81 relative to the reference strips and to the grid and contour GIS map as at 82 (for defining even, subdivided areas of the reference strips). The resultant "relative" greenness maps and or the percentage canopy maps may then be used to develop the prescriptions necessary to form a nitrogen application map 83 which maps the application areas and/or rates necessary to bring the crop in the field up to some desired level of nitrogen. For example, application map 83 may indicate the nitrogen fertilizer required to ensure sufficient levels for the remainder of the growing season.

It should be recognized that later in the growing season where the crop canopy reaches almost 100%, there may be little reason to differentiate between soil and green plants because the entire field is vegetation. The only difference in the field will be areas that require more nitrogen fertilizer to bring the greenness level back to that which it should be for proper and maximum plant or crop yield.

As described in the parent application, crop nitrogen status may also be identified or described using ratios of various image planes, such as green/near infra red or red/near infrared. Thus, a normalized difference vegetative index (NDVI) or green NDVI may be employed to separate the vegetation pixels from the non-vegetation pixels and therefore may be employed in lieu of green plane determination to determine N status. For example, as taught in the parent application, the NDVI index for each pixel may be calculated by subtracting the red value from the near infrared value and dividing the result from the addition of the red value and the near infrared value. The vegetation image map is generated using the NDVI value for each pixel in the multi-spectral image. In these instances, it may also be advantageous to provide high nitrogen reference strips. Vegetation indices, like NDVI, will likely be more useful during the earlier growing season in situations where segmenting out soil is difficult because of insufficient spatial resolution. Because vegetation indices include information about relative soil coverage and also about crop chlorophyll levels, such vegetation indices may be used along with or as an alternative to relative greenness maps.

This could be accomplished in much the same manner as has heretofore been described except would utilize a developed layer (NDVI) instead of just the green plane. In this instance, the nitrogen status would be evaluated by the ratio of NDVI values for each pixel with the NDVI value for the adjacent high nitrogen reference strip.

As described, the georeferenced "relative" greenness map provides crop status information with resolution equal to the spatial resolution of the original aerial images. The map may then be converted to a nutrient (e.g. nitrogen) recommendation map via a look up table based upon the relative greenness values and stage of crop development. In this manner areas of the field showing significant nutrient stress would receive a necessary dose of nitrogen while areas with relative greenness values similar to those of the reference rows would receive little or no additional fertilizer. Of course the recommended rates of fertilizer application would depend upon several factors such as stage of crop growth, (higher levels of nitrogen being required for stress observed in early growing season as compared to crop stress observed closer to harvest.)

Additional Exemplary Embodiments

Figure 7:
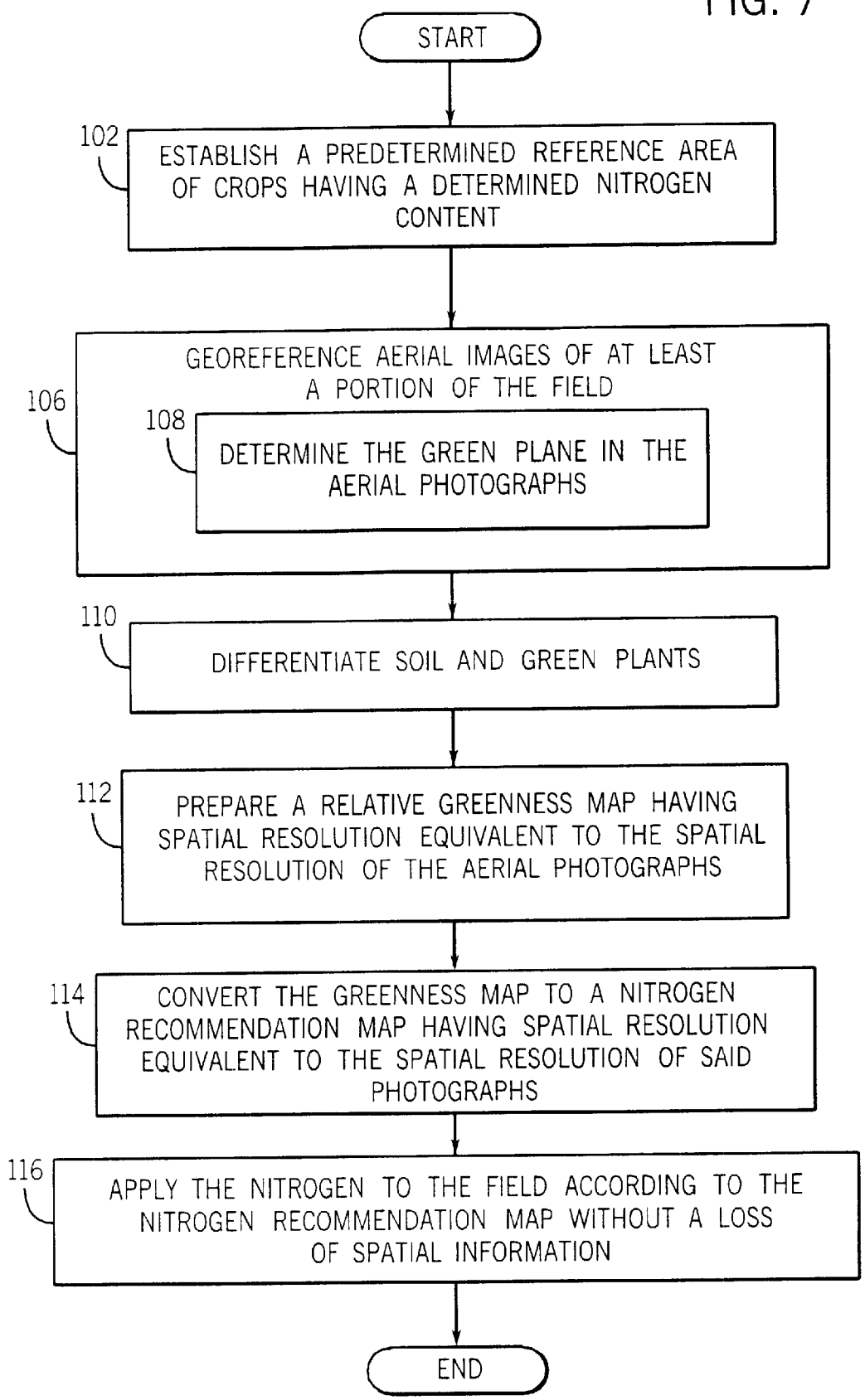
FIG. 7 is a flowchart illustration for a process for determining the health of crops in a field and for correcting deficiencies in the health of the crops.
Figure 8:
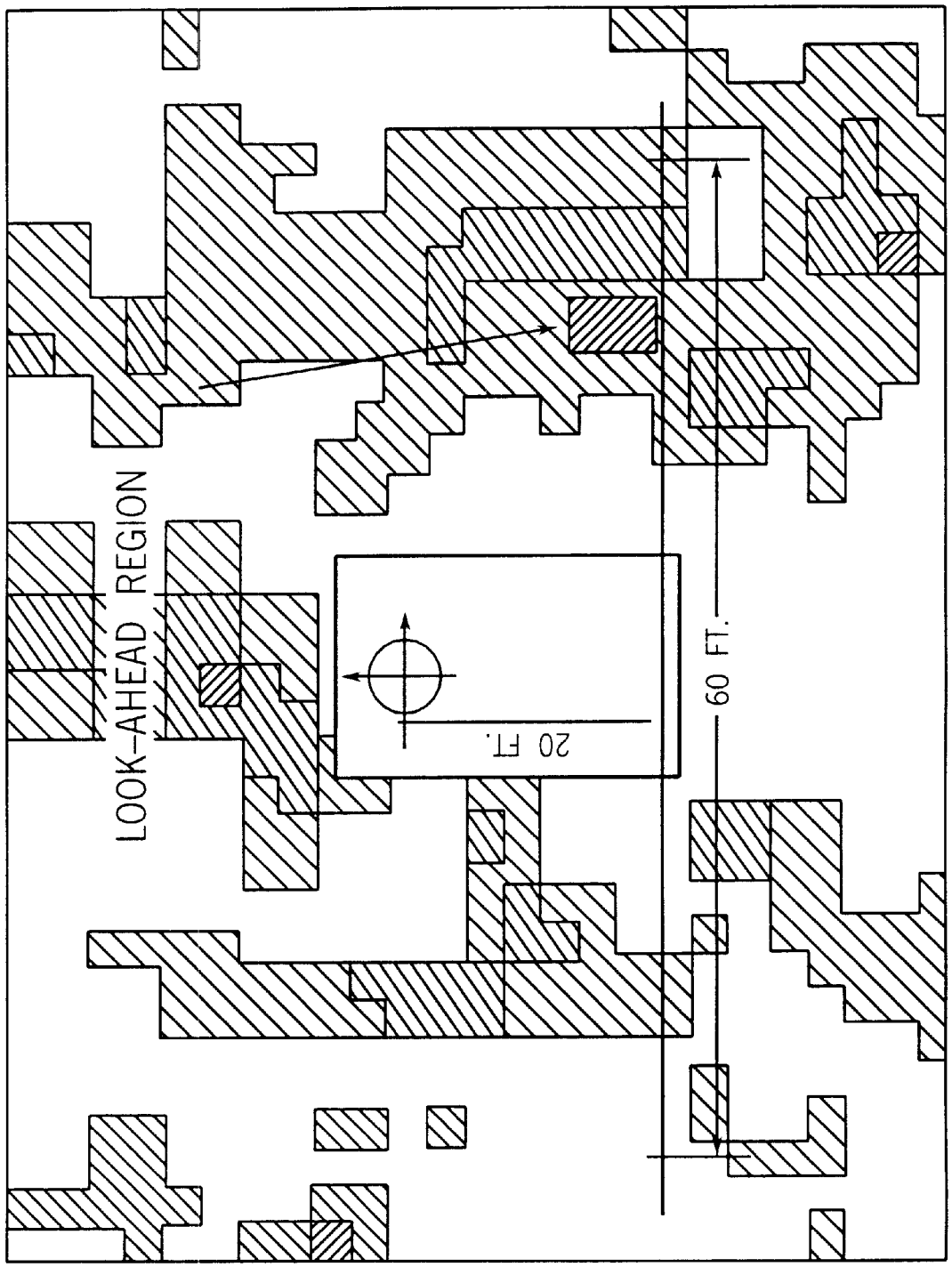
FIG. 8 is a schematic illustration of a greenness map according to an exemplary embodiment.
Figure 9:
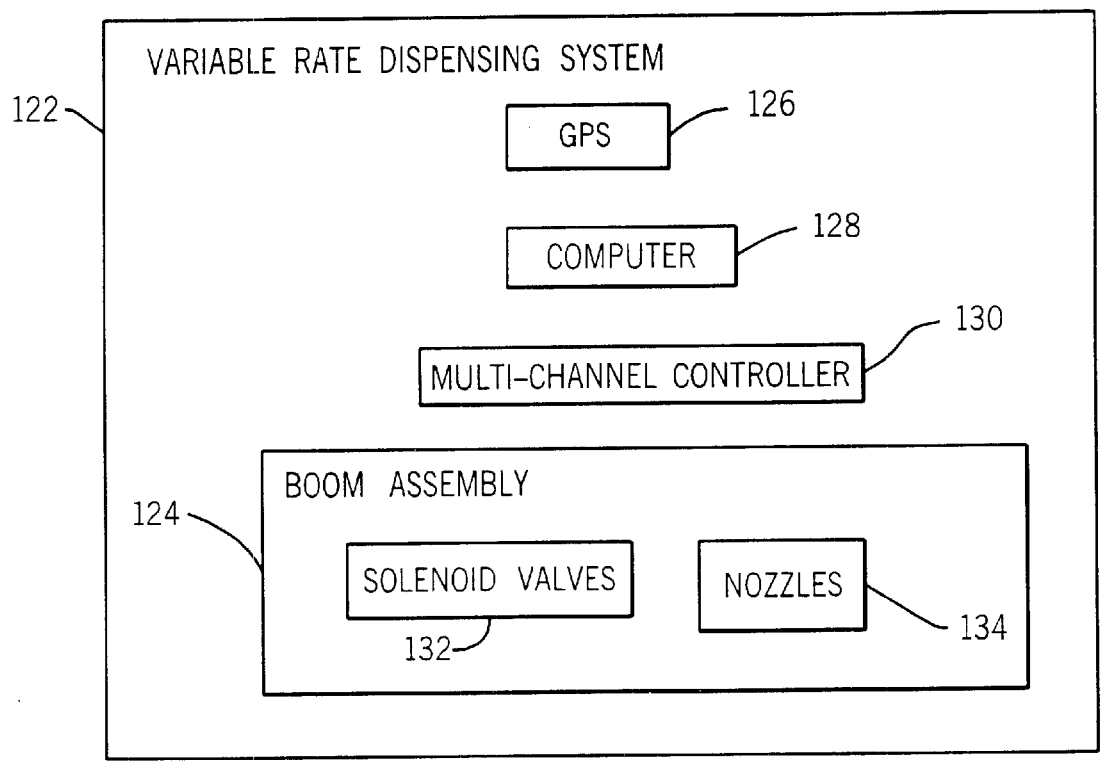
FIG. 9 is a schematic illustration of a variable rate dispensing system.

Referring to FIGS. 7–9, additional exemplary embodiments of the method of determining and treating the health of a crop are shown.

FIG. 7 schematically illustrates a method of determining the health of crops in a field and correcting deficiencies in the health of crops wherein an aerial image is used directly as an application map (as illustrated in FIG. 8). According to a preferred embodiment, the aerial image is a digital image. According to alternative embodiments, the aerial image may be any of a variety of images taken from an "aerial" perspective (e.g., infrared images with a (e.g., three or four) bands, scanned soil map from a soil book, digital or analogue photographs, etc.).

In a field in which the health of the crops is to be determined, at least one predetermined reference area of crops having a determined nutrient (e.g., nitrogen or any other nutrient that is detectable, non-visible waveforms)

content is established (step 102). The nutrient reference area may be established, for example, by applying a predetermined quantity of nutrient to crops in the reference area.

The aerial image has a particular spatial resolution of at least a portion of the field, and is taken and "registered" or georeferenced using any of a variety of "registering" or georeferencing techniques (step 106). For example, registering may include synchronizing GPS location data with reference points within the predetermined reference area. The reference points are preferable landmarks that are visible in the aerial image. For example, a reference point may be provided by a known ground location marked by a visible object or target (e.g., a four foot by four foot sheet of plywood). Where there is a relatively hilly terrain, additional targets may be used to improve accuracy of the registration. Flatter terrain may require less targets. Registering or georeferencing reference points on the aerial image attributes a GPS position to one or more locations on the aerial image. Reference points established in the field are intended to improve GPS accuracy and to facilitate the formation of a composite graphical representation of the field so that the nutrient is applied to the field in accordance with a greenness application map in georeferenced areas having nutrient deficiency. According to a preferred embodiment, four targets are registered.

The aerial image may be taken from any of a variety of methods (e.g., from a land vehicle, airplane, helicopter, pilotless drone, satellite, etc.). According to an exemplary embodiment, a digital photograph taken by a digital camera commercially available from Kodak model—DCS 460 which has an approximate resolution of 1000 pixels by 1000 pixels. The aerial image provides approximately one square meter per pixel. Alternatively, any of a variety of photographic equipment, resolution, or pixel-to-area ratio is possible. Each pixel has grey level information that is based on the reflectance of the plants and soil. Acquiring the aerial image may include taking a plurality of pictures in sequence, and piecing the photographs together to form a composite of the field.

The green plane in the aerial photographs is determined (step 108). According to a preferred embodiment, the green plane is determined by determining the greenness value for each pixel. Determining the green plane in the photograph may also include differentiating soil and green plants in the photograph by segmenting images to select crop pixels while discarding soil pixels (e.g., by separating the image into green, red and near infrared planes) (step 110). Alternatively, a group of adjacent pixels can be grouped and their greenness values averaged and assigned to the area represented by that group of pixels.

A relative "chlorophyll" or "greenness" map is prepared based upon any of a variety of techniques (step 112). According to a preferred embodiment, the relative greenness map is based upon greenness values relative to the reference in the aerial photographs of the field. As such, the relative greenness map provides crop status information having spatial resolution equivalent to the spatial resolution of the aerial photographs. The images may be loaded into geographic information system (GIS) software such as ArcView GIS 3.2 commercially available from ESRI of Redlands, Calif. GIS software is used to analyze photographs and to store and manage data in one or more databases. After nutrient application amounts are assigned 120 to greenness values (or ranges of greenness values), the deficient nutrient may be applied to the field where it is needed.

The relative greenness map is then converted to a nutrient recommendation map (step 114). According to a preferred embodiment, the greenness map is converted using a "look-up table." The greenness value for each pixel is entered into a look-up table (alternatively, depending on the limitations of the GPS system being used, a nutrient value may be obtained for a group of pixels if the response time of the system is limited), a recommended amount of nutrient application for that pixel (or that group of pixels) is identified and related or linked to the pixel (or the group of pixels) on the nutrient recommendation map. Because the nutrient recommendation map is created directly from the greenness map using a look-up table, the nutrient recommendation map has spatial resolution that is equivalent to the spatial resolution of the greenness map and the aerial photographs. The nutrient is then applied to the field according to the nutrient recommendation map without loss of spatial information between the aerial image and the nutrient recommendation map (step 116). As such, the crops in the field are treated in accordance with the relative greenness map, whereby the treatment is performed without loss of spatial information.

According to one advantageous aspect, the image may be stored as a raster file. Raster files have advantages over vector files, in that raster files preserve spatial equivalence from the image to the greenness map and to the nutrient recommendation map, which allows for more accurate dispensing of nutrients. Some vector file formats were developed when computer processing time and memory storage were more limited. Other file formats that preserve spatial equivalence are also contemplated.

File formats that preserve spatial equivalence also allow an independent nozzle control feature. Referring to FIG. 9, independent nozzle control may be accomplished by a variable rate dispensing system 122 having a boom assembly 124 configured to deliver crop inputs over a geographic area exhibiting changes in soil or crop nutrient levels (e.g., nutrient deficiency variances from pixel to pixel or from one group of pixels to another group of pixels). According to an exemplary embodiment, variable rate dispensing system 122 includes a GPS system 126, a computer 128, a multi-channel controller 130, and PWM solenoid valves 132. Based upon pressure and flow characteristics, computer 128 and multi-channel controller 130 control pulse width modulated (PWM) valves 132 so that the desired amount of nutrient is dispensed at any of a variety of ground speeds of the farm machinery. As boom assembly 124 travels the field, system 122 determines the location of each of nozzle 134 (e.g., using GPS system 126) relative to a "look ahead region," which is an area of ground equivalent to the pixel or the group of pixels that the particular nozzle 134 will pass over as it leaves the area of ground (equivalent to the pixel or group of pixels) it is currently spraying. System 122 then controls each dispensing nozzle 134 to deliver the desired quantity of crop inputs required of the respective area being treated based on the nutrient recommendation map. Adjacent nozzles may deliver or dispense crop inputs that are the same or different than that being dispensed from other nozzles on the boom assembly. Boom assembly 124 simultaneously treats pixels providing different nutrient requirements because the variable rate dispensing system will independently vary the dispensing rate of crop inputs for each spray nozzle 134 or group of spray nozzles simultaneously. As such, areas of the field showing significant nutrient stress would receive a necessary dose of the lacking nutrient (e.g., nitrogen) while areas with relative greenness values similar to those of the reference rows would receive little or no additional nutrient fertilizer. The recommended rates of fertilizer application would depend upon several factors such as stage of crop growth (e.g., higher levels of nitrogen being required for stress observed in early growing season as compared to more mature crop stress closer to harvest.)

Advantageously, the greenness maps and/or nutrient recommendation maps described above are stored as an array of digitized data (e.g., raster files) having a resolution equivalent to or based upon the spatial resolution of the photograph. Each pixel, or each group of pixels, in the greenness maps and nutrient recommendation maps is related to digitized data on the array. Each pixel has a corresponding nutrient recommendation value that is used to drive the application of the agricultural input. Because the variable rate dispensing system allows for independent control of the nozzle, a map based on a raster file allows for better and individual control of farm inputs. Also, use of raster files provides for shorter processing time by taking advantage of the relative inexpensive cost of memory storage in conventional computer systems. According to an alternative embodiment, the maps are based on vector files wherein the field is segmented according to similar grey levels.

While the embodiments illustrated in the various drawings described above are presently preferred, it should be understood that those embodiments are offered by way of example only. For example, the described processes and systems may be used for other farming activities such as tillage, seeding, applying herbicides or pesticides, etc. The invention is not intended to be limited to any particular embodiment but is intended to extend to various modifications that nevertheless fall within the scope of the appended claims.

Having thus described the invention, what is claimed is:

1. A process for determining the health of crops in a field comprising the steps of:
    applying a predetermined quantity of nutrient to crops in a reference area of a field in which the health of the crops is to be determined;
    georeferencing aerial photographs of at least a portion of said field, said aerial photographs having a particular spatial resolution;
    identifying the greenness of the reference area in the photographs; and
    preparing a relative greenness map of the field that indicates greenness of different portions of the field in the photographs relative to the reference area greenness, said relative greenness map including relative greenness values and having a spatial resolution equivalent to the spatial resolution of said aerial photographs.

2. The process for determining the health of crops in accordance with claim 1, including the step of, in a field in which the health of the crops is to be determined, converting said relative greenness map directly to a nutrient recommendation map based upon the relative greenness values.

3. The process for determining the health of crops in accordance with claim 1, including the step of, in a field in which the health of the crops is to be determined, applying nutrient to said field according to said nutrient recommendation map.

4. The process for determining the health of crops in accordance with claim 1, wherein said aerial photographing step includes taking a plurality of pictures in sequence, and piecing said photographs together to form a composite of the field.

5. The process for determining the health of crops in accordance with claim 4, including the step of establishing reference points in said field to improve GPS accuracy.

6. The process for determining the health of crops in accordance with claim 4, including establishing reference points to facilitate the formation of a composite photographic representation of said field.

7. The process for determining the health of crops in accordance with claim 1, further including the step of applying nutrients to said field in accordance with said greenness application map in georeferenced areas of nutrient deficiency.

8. The process for treating crops in accordance with claim 1, including the step of photographing from the air, georeferenced portions of said field, using a particular spatial resolution.

9. The process for determining the health of crops in accordance with claim 1 wherein the step of applying a predetermined quantity includes applying a quantity that is greater than would normally be applied to the reference area.

10. The process for determining the health of crops in accordance with claim 1 wherein the step of applying a predetermined quantity includes applying the predetermined quantity to a plurality of reference areas scattered throughout the field and wherein the step of preparing a relative greenness map includes preparing a map that indicates greenness of different portions of the field in the photographs relative to the closest of the reference areas.

11. The process for determining the health of crops in accordance with claim 1, wherein the nutrient is nitrogen.

* * * * *